United States Patent [19]

Williams et al.

[11] Patent Number: 4,626,003
[45] Date of Patent: Dec. 2, 1986

[54] CONSTANT MOTION SWIVEL SEAL ASSEMBLY

[75] Inventors: Michael R. Williams, Houston; Neil G. Weber, Austin, both of Tex.

[73] Assignee: FMC Corporation, Chicago, Ill.

[21] Appl. No.: 740,710

[22] Filed: Jun. 3, 1985

[51] Int. Cl.[4] .............................................. F16L 17/06
[52] U.S. Cl. ...................................... 285/98; 285/276; 277/188 R
[58] Field of Search ........................ 285/276, 98, 281; 277/186, 188 R, 92, 95

[56] References Cited

U.S. PATENT DOCUMENTS

| 2,382,375 | 8/1945 | Allen et al. ............. | 285/276 X |
| 3,727,950 | 4/1973 | Swanson .................. | 285/276 X |
| 3,997,198 | 12/1976 | Linder .................... | 285/98 |
| 4,556,223 | 12/1985 | Van Loon .................. | 277/188 R |

FOREIGN PATENT DOCUMENTS 726060  1/1966  Canada ................................ 285/98

Primary Examiner—Dave W. Arola
Attorney, Agent, or Firm—L. B. Guernsey; H. M. Stanley; R. B. Megley

[57] ABSTRACT

A constant motion swivel seal assembly having greatly improved useful life without leakage of fluid from a swivel joint. The seal assembly includes one or more annular sealing rings rotatably positioned between an outer joint member and an inner joint member. A wedge-shaped anti-extrusion ring mounted between the annular sealing ring and a gap between the inner and outer joint members prevents the sealing ring from extrusion into the gap. The anti-extrusion ring has a relatively large surface area in contact with the inner joint member and a relatively small surface area in contact with the outer joint member so the anti-extrusion ring remains in substantially the same position relative to the inner joint member. The relatively small area of contact between the outer joint member and the anti-extrusion ring allows the anti-extrusion ring to slide over the surface of the outer joint member as the outer joint member rotates relative to the inner joint member. Hoop stress also prevents fluid pressure from forcing the anti-extrusion ring radially outward against the outer joint member while fluid pressure axially presses the anti-extrusion ring tightly against an end portion of the inner joint member. A relatively small area of contact between the sealing ring and the inner member and a larger area of contact between the sealing ring and the outer member allows the sealing ring to slide over the inner member and rotate with the outer member.

10 Claims, 4 Drawing Figures

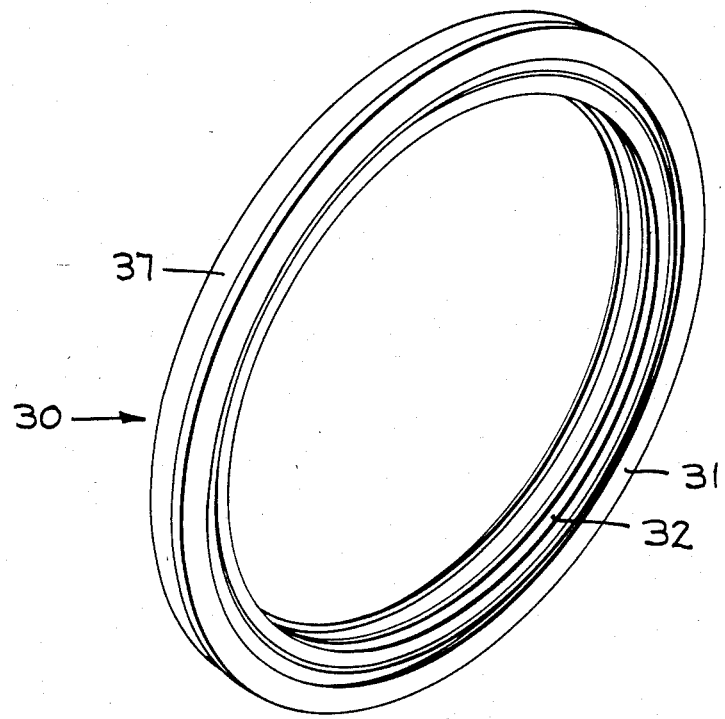
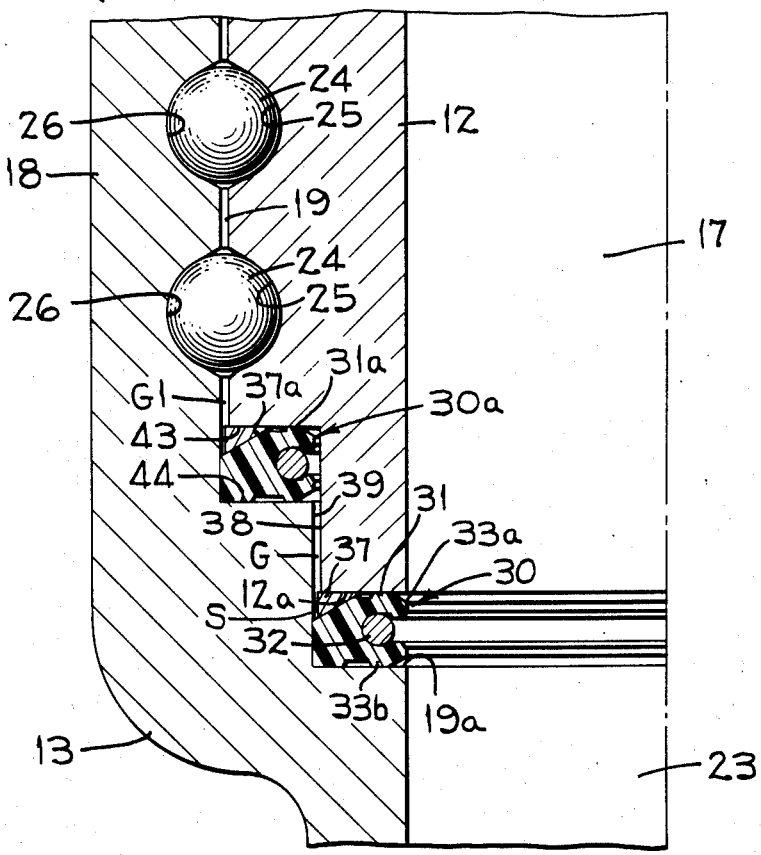

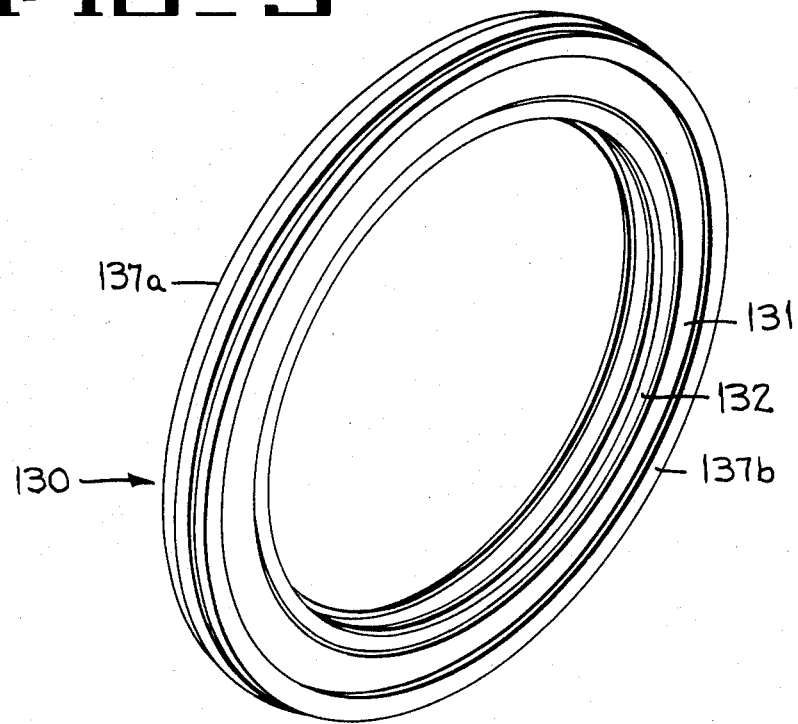
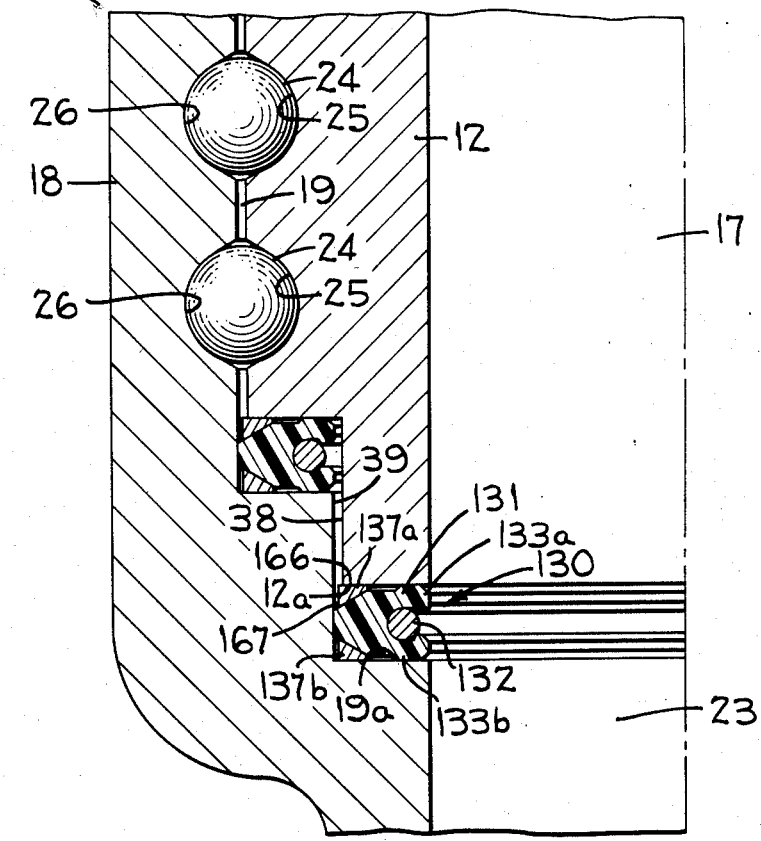

CONSTANT MOTION SWIVEL SEAL ASSEMBLY

BACKGROUND OF THE INVENTION

This invention relates to pipe swivel joints, and more particularly to swivel seal assemblies especially adapted for use in constant motion service.

A production of oil and gas from offshore wells is a common endeavor in the petroleum industry. A well or cluster of wells is drilled in the ocean floor and fluid from these wells transported by conduit to marine tankers which transport the fluid to shore facilities. A system of pipelines convey the fluid from the wells to a platform or floating buoy to which a marine tanker may be attached. The pipeline system includes one or more pipes or conduits extending generally horizontally across the ocean floor from the wells to a point below the floating buoy and a generally vertical pipe or hose extending from the buoy to the horizontal pipe. At a plurality of locations in the pipeline system connections are needed between the various pipes. A flexible hose or an articulated loading arm secured between the buoy and the marine tanker may include one or more connections. Some of these connections are used to permit one pipe or hose to rotate relative to an adjacent pipe or hose by the use of swivel joints.

Some of the swivel joints include one joint portion which rotates relative to another joint portion on occasional basis and other swivel joints include a first joint portion which is in almost constant motion relative to another joint portion. One location where a constant motion swivel joint is often used is in the flexible hose extending between the tanker and the buoy anchored to the ocean floor. In prior art swivel joints the seals of the joints wear rapidly due to the constant motion so the joint quite often fails and the seals must be replaced. Some of the prior art seals include a thin annular anti-extrusion ring mounted between the main seal and a gap between an inner joint member and an outer joint member. These anti-extrusion rings usually fail after a few thousand oscillations of the joint because high pressure forces a portion of the anti-extrusion ring into the gap between the joint members causing the anti-extrusion rings to break. When the joint is located beneath the surface of the ocean, especially at a great depth, a replacement of these seals is usually difficult and very expensive.

SUMMARY OF THE INVENTION

The present invention comprises a constant motion swivel seal assembly for use with a pipe swivel joint. This invention overcomes some of the disadvantages of the prior art by providing a swivel seal assembly for use with a generally cylindrical outer member having an axially extending passage to receive a generally cylindrical inner member, a radial flange extending inward from the axial passage, a bore extending axially through the inner member and an annular seal assembly mounted between the radial flange and an end of the inner member. The seal assembly includes an annular sealing ring having a generally U-shaped cross-section and an annular anti-extrusion ring having a generally wedge-shaped cross-section, the anti-extrusion ring being mounted between the sealing ring and a junction between an outer wall of the inner member and the axial passage of the outer member. The thicker portion of the anti-extrusion ring is mounted adjacent a gap at the junction between the inner and outer members. The thick portion of the anti-extrusion ring prevents the ring from being forced into the gap at the juction of the joint members and greatly extends the life of the anti-extrusion ring. A relatively small surface of the sealing ring is against a smooth surface of the inner member and a relatively large surface of the sealing ring is against a surface of the outer member causing the sealing ring to stick with the outer member and to slide over the smooth surface of the inner member as the inner member rotates relative to the outer member. Conversely, a relatively large surface of the anit-extrusion ring is against a surface of the inner member so the anti-extrusion ring stays with the inner member. The sealing ring and the anti-extrusion ring are each made of a low friction material so the surface of the sealing ring can easily slide over the surface of the anti-extrusion ring.

BRIEF DESCRIPTION OF THE DRAWINGS

FIG. 1 is an isometric view of a constant motion swivel seal assembly of the present invention.

FIG. 2 is a vertical section through a swivel joint having a pair of constant motion seal assemblies of the present invention mounted in the swivel joint.

FIG. 3 discloses another embodiment of a constant motion swivel seal assembly of the present invention.

FIG. 4 is the vertical section through a swivel joint having a pair of the constant motion seal assemblies of FIG. 3 mounted in the swivel joint.

DESCRIPTION OF THE PREFERRED EMBODIMENT

A constant motion swivel joint 11 using a constant motion swivel joint assembly of the present invention is illustrated in detail in FIG. 2. The swivel joint 11 includes an inner or male member 12 for connection to a first pipe or hose (not shown) and an outer or female member 13 for connection to a second pipe or hose (not shown). An axial bore 17 extends through the length of the inner member 12 to provide a path for fluid to flow.

The outer member 13 (FIG. 2) includes an enlarged upper portion 18 having an axially extending passage 19 to receive the inner member 12 in position to transfer fluid between bore 17 and an axially aligned bore 23 of the outer member 13. As indicated in FIG. 2 the members 12 and 13 are rotatably held in axial alignment by a plurality of ball bearings 24 in a plurality of annular bearing races 25, 26. A constant motion swivel assembly 30 (FIGS. 1, 2) is mounted between a lower end 12a of the inner member 12 and a lower end 19a of the passage 19.

The swivel assembly 30 includes an annular sealing ring 31 having a generally U-shaped cross-section with an internally mounted expander such as an O-ring 32 to bias a pair of fingers 33a, 33b axially against end 12a of member 12 and against end 19a of the passage 19 to provide a fluid-tight seal. A wedge-shaped anti-extrusion ring 37 is mounted between sealing ring 31 and a gap G between an outer wall 38 of the inner member 12 and an inner wall 39 of outer member 13 with the thicker portion of ring 37 adjacent the gap G. Pressure from fluid in the bores 17, 23 presses the anti-extrusion ring 37 tightly against the lower end 12a of inner member 12, while the hoop stress of anti-extrusion ring 37 prevents the fluid pressure from pressing the ring 37 as tightly against the inner wall 39 of outer member 13. Also, a relatively large surface of the anti-extrusion ring 37 is pressed against the surface at the end 12a of member 12 and a relatively small surface S of ring 37 (FIG. 2) is against the wall 39 of the outer member 13. As a result, anti-extrusion ring 37 rotates along with inner member 12 and slides over the surface of inner wall 39 as inner member 12 rotates relative to outer member 13. The wedge-shape of anti-extrusion ring 37 and the corresponding mating shape of sealing ring 31 causes fluid pressure to press anti-extrusion ring 37 upward and outward toward gap G to enhance the sealing action between ring 37 and members 12 and 13. Sealing ring 31 may be made from a plastic material such as Teflon and anti-extrusion ring 37 may be made of metal or of a firm plastic material such as Ryton (polyphenylene sulfide).

The sealing ring 31 has a relatively small surface against the surface at the lower end 12a of the inner member 12. This surface at end 12a can be polished to further reduce friction and the Teflon sealing ring 31 has a low coefficient of friction so it is able to slide over the adjacent surface of the member 12. The sealing ring 31 has a relatively large surface against the end 19a of passage 19 causing the sealing ring 31 to stick with the outer member 13 as outer member 13 rotates relative to inner member 12. A rougher surface at the end 19a of the passage 19 can be used to insure that sealing ring 31 does rotate with the outer member 13. The amount of friction between the Teflon sealing ring 31 and the Ryton anti-extrusion ring 37 is extremely low so ring 37 can rotate relative to ring 31. High pressures inside the axial bores 17, 23 would cause the Teflon material to flow into gap G without the Ryton or metal ring 37. Ring 37 could be formed from a metal impregnated with Teflon to provide both a firm material which would not flow into the gap G (the metal portion of the ring) and a low friction, from the Teflon portion of the ring. Any metal in ring 37 which contacts the surfaces of the members 12, 13 would be worn away by motion of the members 12, 13 and the Teflon would remain as a low friction material in contact with the surface of members 12, 13.

A second constant motion swivel assembly 30a (FIG. 2) is mounted between a shoulder 43 on the outer portion of inner member 12 and a shoulder 44 in passage 19 of outer member 13. The pressure in gap G presses a sealing ring 31a of swivel assembly 30a against an anti-extrusion ring 37a to secure ring 37a adjacent a gap G1, between members 12 and 13.

Constant motion swivel assembly 30 (FIG. 2) provides an excellent seal when installed as shown, but it does not seal well if the assembly should inadvertently be installed upside down with ring 37 adjacent end 19a of passage 19 and with ring 31 adjacent gap G. In this upside down position a portion of sealing ring 31 may be forced into gap G and this portion pulled away from the remainder of the ring when the inner member 12 rotates relative to the outer member 13. A second embodiment of the present invention (FIGS. 3, 4) alleviates this problem when the swivel assembly is installed by inexperienced personnel.

The embodiments of FIGS. 3 and 4 includes a swivel assembly 130 having an annular sealing ring 131 with a generally U-shaped cross-section with an O-ring 132 mounted inside ring 130 to bias a pair of fingers 133a, 133b axially against end 12a of member 12 and against end 19a of passage 19 to provide a fluid-tight seal. A pair of anti-extrusion rings 137a, 137b are mounted adjacent the sealing ring 131 with ring 137a mounted above ring 131 and anti-extrusion ring 137b mounted below sealing ring 131. However, the entire assembly 130 can be turned over with anti-extrusion ring 137b on top of the sealing ring 131 and an anti-extrusion ring 137a below the sealing ring 131 and work just as well. The wedge-shaped anti-extrusion ring 137a has an upper surface 166 having a greater area than a side surface 167 thereby providing a greater amount of friction between surface 166 and a lower end 12a of member 12 than is provided between surface 167 and an inner wall 39 of outer member 13. This also aids in having ring 137a rotate with inner member 12 and sliding along the iner wall 39 of outer member 13.

Thus, the U-shaped sealing ring and the O-ring provide a fluid-tight seal between the inner and outer joint members, and the wedge-shaped anti-extrusion ring has a thick portion adjacent a gap between the inner and outer joint members to prevent the sealing ring from being pressed into the gap and damaged.

Although the best mode contemplated for carrying out the present invention has been herein shown and described, it will be apparent that modification and variation may be made without departing from what is regarded to be the subject matter of the invention.

What is claimed is:

1. A constant motion swivel seal assembly for use in a constant motion swivel joint, said seal assembly comprising:

a generally cylindrical inner member having a bore extending axially therethrough;

a generally cylindrical outer member having a bore extending axially through a first portion of said outer member, said outer member having an axially extending passage to receive said inner member, said passage extending through a second portion of said outer member;

an annular sealing ring mounted between an end of said inner member and an end of said axial passage to provide a fluid-tight seal between said inner member and said outer member, said sealing ring being made of material havng a low coefficient of friction, said sealing ring having a relatively large surface against an adjacent surface of said outer member and a relatively small surface against an adjacent surface of said inner member so said sealing ring slides over said surface of said inner member and rotates with said outer member; and a wedge-shaped annular anti-extrusion ring mounted between said annular sealing ring and a junction between said axial passage of said outer member and an outer surface of said inner member, said anti-extrusion ring having a relatively large surface against an adjacent surface of said inner member and a relatively small surface against an adjacent surface of said outer member causing said anti-extrusion ring to slide over said surface of said outer member and to rotate with said inner member, said sealing ring having a relatively small surface against an adjacent surface of said anti-extrusion ring so said sealing ring slides over said surface of said anti-extrusion ring during rotation.

2. A constant motion swivel seal assembly as defined in claim 1 wherein a thicker portion of said anti-extrusion ring is positioned adjacent said junction of said inner and said outer members.

3. A constant motion swivel joint assembly as defined in claim 1 wherein said sealing ring forms a generally U-shaped cross-section and wherein said assembly includes an expander mounted inside said U-shaped sealing ring to bias a first and a second end portion of said sealing ring outwardly to ensure a tight seal between said inner and said outer members.

4. A constant motion swivel joint assembly as defined in claim 1 wherein said sealing ring forms a generally U-shaped cross-section and wherein said assembly includes an O-ring mounted inside said U-shaped sealing ring to bias a first and a second end portion of said sealing ring outwardly to ensure a tight seal between said inner and said outer members.

5. A constant motion swivel joint as defined in claim 1 wherein said anti-extrusion ring is formed from a low friction material.

6. A constant motion swivel joint as defined in claim 1 including a relatively rough surface on said outer member adjacent said surface of said sealing ring to provide a relatively large amount of friction between said sealing ring and said outer member and insure that said sealing ring does rotate with said outer member.

7. A constant motion swivel seal assembly for use in a constant motion swivel joint, said joint having a generally cylindrical inner member with an axial bore extending therethrough and a generally cylindrical outer member having an axial bore extending through a first portion of said outer member, said outer member having an axially extending passage to receive said inner member, said passage extending through a second portion of said outer member, said seal assembly comprising:

an annular sealing ring having a generally U-shaped cross-section, said sealing ring being mounted between an end of said inner member and an end of said axial passage in said outer member with a first end portion of said U-shaped ring mounted against said end of said inner member and a second end portion of said U-shaped ring mounted against said end of said axial passage, said sealing ring being made of material having a low coefficient of friction, said sealing ring having a relatively large surface against an adjacent surface of said outer member and a relatively small surface against an adjacent surface of said inner member so said sealing ring slides over said surface of said inner member and rotates with said outer member;

an elastomeric O-ring mounted inside said U-shaped sealing ring to bias said first end portion of said sealing ring against said end of said inner member and bias said second end portion of said sealing ring against said end of said passage to provide a fluid-tight seal; and an annular anti-extrusion ring having a generally wedge-shaped cross-section, said anti-extrusion ring being mounted between said annular sealing ring and a junction between said axial passage of said outer member and an outer surface of said inner member, said anti-extrusion ring having a relatively large surface against an adjacent surface of said inner member and a relatively small surface against an adjacent surface of said outer member causing said anti-extrusion ring to slide over said surface of said outer member and to rotate with said inner member, said sealing ring having a relatively small surface against an adjacent surface of said anti-extrusion ring so said sealing ring slides over said surface of said anti-extrusion ring during rotation.

8. A constant motion seal assembly as defined in claim 7 wherein a thicker portion of said anti-extrusion ring is positioned adjacent said junction of said inner and said outer members.

9. A constant motion swivel joint as defined in claim 7 wherein said anti-extrusion ring is formed from a low friction material.

10. A constant motion swivel joint as defined in claim 7 including a relatively rough surface on said outer member adjacent said surface of said sealing ring to provide a relatively large amount of friction between said sealing ring and said outer member and insure that said sealing ring does rotate with said outer member.

* * * * *